(12) United States Patent
Hubbard et al.

(10) Patent No.: US 6,751,715 B2
(45) Date of Patent: Jun. 15, 2004

(54) SYSTEM AND METHOD FOR DISABLING AND RECREATING A SNAPSHOT VOLUME

(75) Inventors: Scott Hubbard, Wichita, KS (US); Patrick Flynn, Wichita, KS (US); Donald Humlicek, Wichita, KS (US); Dean Lang, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 390 days.

(21) Appl. No.: 10/015,506

(22) Filed: Dec. 13, 2001

(65) Prior Publication Data

US 2003/0115431 A1 Jun. 19, 2003

(51) Int. Cl.[7] .............................. G06F 12/00
(52) U.S. Cl. ................. 711/162; 711/161; 707/204; 714/6; 714/15
(58) Field of Search .................. 711/162, 161; 707/204; 714/6, 15

(56) References Cited

U.S. PATENT DOCUMENTS

| | | | | |
|---|---|---|---|---|
| 5,481,694 A | * | 1/1996 | Chao et al. | 711/112 |
| 6,081,875 A | * | 6/2000 | Clifton et al. | 711/162 |
| 6,119,131 A | * | 9/2000 | Cabrera et al. | 707/203 |
| 6,119,208 A | * | 9/2000 | White et al. | 711/162 |
| 6,182,198 B1 | * | 1/2001 | Hubis et al. | 711/162 |
| 6,212,531 B1 | * | 4/2001 | Blea et al. | 707/204 |
| 6,594,744 B1 | * | 7/2003 | Humlicek et al. | 711/162 |

OTHER PUBLICATIONS

Jones, "An Introduction to Data Warehousing: What Are the Implications for the Network?" Intl Journal of Network Management, vol. 8, pp 42–56, 1998.*

Ram et al., "Extracting Delta for Incremental Data Warehouse Maintenance," pp 220–229, IEEE, Mar. 2000.*

* cited by examiner

*Primary Examiner*—Matthew Kim
*Assistant Examiner*—Stephen Elmore
(74) *Attorney, Agent, or Firm*—Suiter West, PCLLO

(57) ABSTRACT

The present invention is directed to a system and method for disabling and recreating a snapshot volume. A method of disabling repository volume activity corresponding to a point-in-time image and retaining repository volume attributes may include initiating a command in a electronic data storage system. The command disables copy-on-write activity to a repository volume created in relation to a first point-in-time image of a base volume, in which repository volume attributes are retained suitable for providing a repository volume corresponding to a second point-in-time image. A method of creating a point-in-time image of a base volume may include initiating a command to create a second point-in-time image of a base volume. The second point-in-time image is created utilizing a repository volume having attributes retained from a repository volume created previously with respect to a first point-in-time image.

20 Claims, 5 Drawing Sheets

SYSTEM AND METHOD FOR DISABLING AND RECREATING A SNAPSHOT VOLUME

FIELD OF THE INVENTION

The present invention generally relates to the field of electronic data storage, and particularly to a system and method for disabling and recreating a snapshot volume.

BACKGROUND OF THE INVENTION

Demand for storing electronic data in an efficient and reliable manner is ever increasing. From e-commerce and everyday business data to personal data and research information, the reliable storage of data is of the utmost importance. Thus, the ability to quickly store data in an efficient manner is now one of the foundations of business operation. One method utilized to provide data security and accessibility is through the use of a "snapshot."

Snapshot capabilities include high-speed replication tools that are useful for creating a point-in-time image of selected volume or volumes. Snapshot images may be utilized to accelerate performance of data intensive tasks such as testing, data mining, off-line backup, and the like.

However, performance penalties may be encountered in the use of a snapshot image. For example, additional capacity may be allocated to store the image and metadata, track changes, and the like. Thus, penalties may be encountered when data is written which affects the captured point-in-time data.

Therefore, it would be desirable to provide a system and method for disabling and recreating a snapshot volume.

SUMMARY OF THE INVENTION

Accordingly, the present invention is directed to a system and method for disabling and recreating a snapshot volume. In a first aspect of the present invention, a method of disabling repository volume activity corresponding to a point-in-time image and retaining repository volume attributes includes initiating a command in a electronic data storage system. The command disables copy-on-write activity to a repository volume created in relation to a first point-in-time image of a base volume, in which repository volume attributes are retained suitable for providing a repository volume corresponding to a second point-in-time image.

In a second aspect of the present invention, a method of creating a point-in-time image of a base volume includes initiating a command to create a second point-in-time image of a base volume. The second point-in-time image is created utilizing a repository volume having attributes retained from a repository volume created previously with respect to a first point-in-time image.

In a third aspect of the present invention, an electronic data storage system includes an electronic data storage device suitable for storing electronic data and a controller operable to initiate a command. The command causes the controller to create a second point-in-time image of a base volume. The second point-in-time image is created utilizing a repository volume having attributes retained from a repository volume created with respect to a first point-in-time image.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown. Data storage devices, such as RAID arrays, electronic data storage devices, storage area networks (SAN), data storage devices associated with information handling systems such as servers, desktop computers, information appliances, and the like, may implement a variety of techniques, such as through the use of a controller, to store data depending on a user's needs, such as persistence, accessibility of data, and the like. A point-in-time image may be taken of a volume of the electronic data stored on the data storage device to enable a user to manipulate the data without affecting the base volume, perform a data back up, and the like. When a point-in-time image, such as a snapshot volume, is made of a base volume, additional capacity is allocated to store (1) any original data blocks that change as a result of writes to the base volume (copy-on-write data), and (2) metadata to keep track of the changes. The additional capacity may be referred to as a repository volume.

When a write is made to the base volume that affects the data "captured" at the point-in-time that the snap volume was created, the copy-on-write activity to the repository volume may cause a decrease in overall I/O performance. The capacity of the repository volume, as well as other repository volume attributes, is set during the snapshot volume creation process. In general, a snapshot volume is used for backup purposes, application testing, and the like. These uses may have a limited life, and therefore would not require the snapshot volume for a long period of time. Therefore, users may generally progress through a cycle of taking a snapshot, using it, discarding it, and then taking a new point-in-time image.

By utilizing the present invention, a user is able to disable or recreate a point-in-time image without deleting and recreating the snapshot volume hierarchy, including the repository volume and its various settings, and the like. Thus, if a user is finished using a snapshot volume, but is not ready to recreate another point-in-time image, a disable option may be utilized to stop copy-on-write activity, and thus eliminate associated performance penalties. If the user is finished using the snapshot volume and is ready to create another point-in-time image, a recreate option may be utilized.

Figure 1:
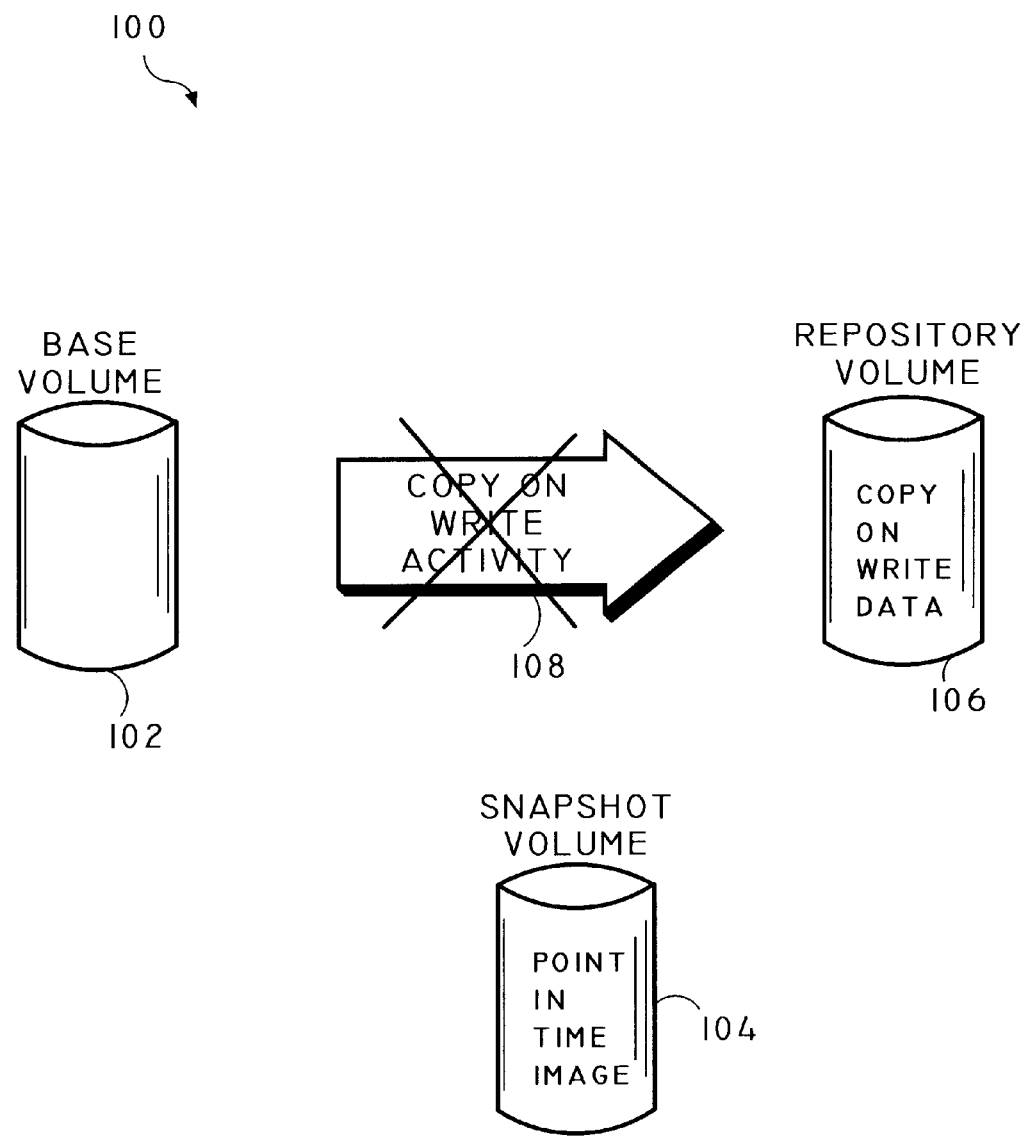
FIG. 1 is an illustration of an embodiment of the present invention wherein a disable command is utilized in a storage device system.

Referring now to FIG. 1, an exemplary embodiment 100 of the present invention is shown wherein a disable command is utilized to eliminate the performance penalty associated with the copy-on-write activity. A base volume 102 is provided suitable for storing electronic data. A user takes a point-in-time image, such as a snapshot volume 104, for backup purposes, application testing, and the like. Additional capacity, such as a repository volume 106, is allocated to store data blocks changed as a result of writes to the base volume 102 and data describing these changes.

After performing the desired functions on the snapshot volume 104 by a user, the user may wish to cease using the snapshot volume 104, but may not be ready to recreate another point-in-time image. Thus, the user initiates a disable option to stop copy-on-write activity 108 to the repository volume 106, and thus, eliminate the associated performance penalty in performing the activity. Additionally, the previously defined repository volume 106 attributes and capacity may be maintained so as to enable a new snapshot volume to be created, along with the repository volume, without having to redefine the attributes.

Figure 2:
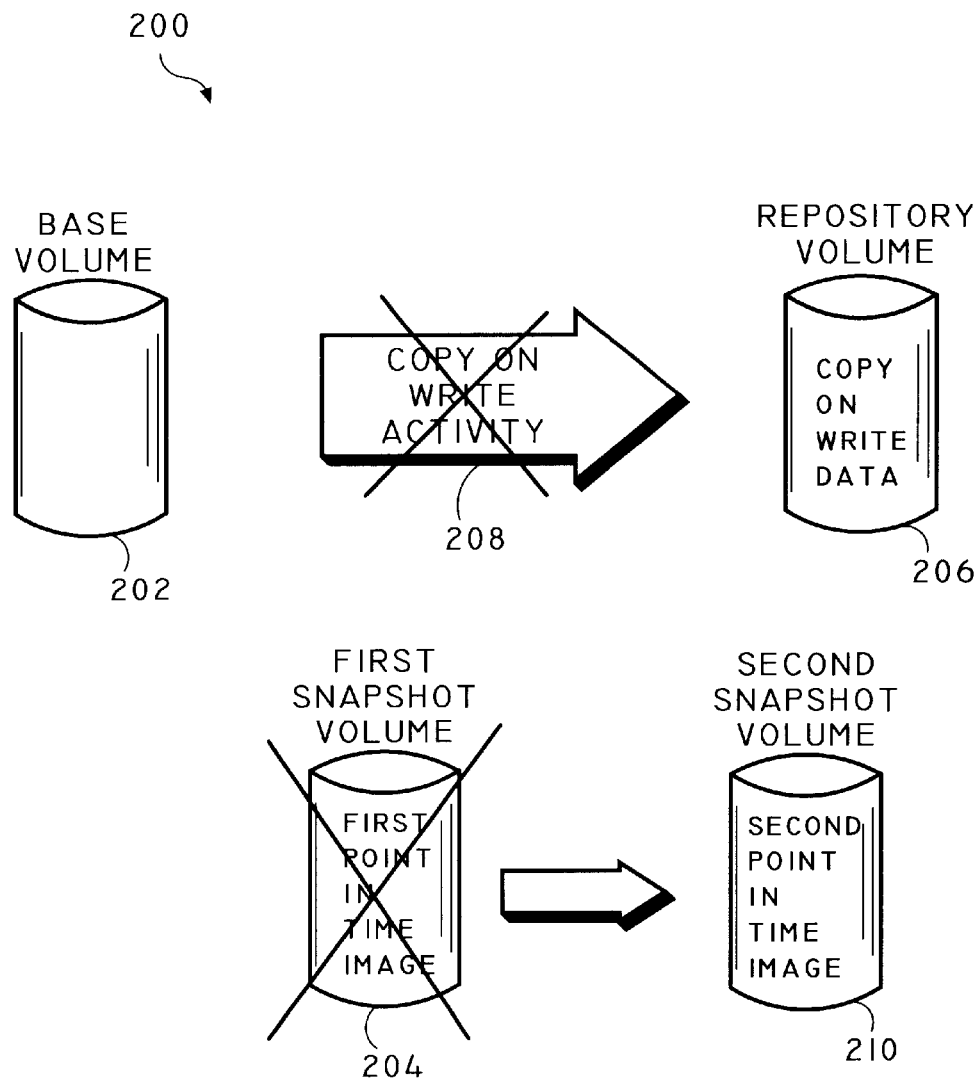
FIG. 2 is an illustration of an embodiment of the present invention wherein a recreate command as utilized in a storage device system is shown.

For example, referring now to FIG. 2, an embodiment 200 of the present invention is shown wherein a recreate command is utilized to recreate a point-in-time image. Again, a user creates a point-in-time image of a base volume 202 and stores the image as a snapshot volume 204. To describe changes made to the base volume 202, such as during creation of the snapshot volume 204, a repository volume 206 is created including copy-on-write data and the like.

Once a user is finished using the snapshot volume and is ready to create another point-in-time image, a recreate command is initiated. The recreate command disables copy-on-write activity 208, deletes copy-on-write data in the repository volume and creates a second snapshot volume 210 using previously defined repository volume attributes and capacity. Thus, a user may quickly progress through a snapshot volume re-creation cycle without having to recreate the repository volume attributes, thereby saving the user time and preserving valuable system resources.

Figure 3:
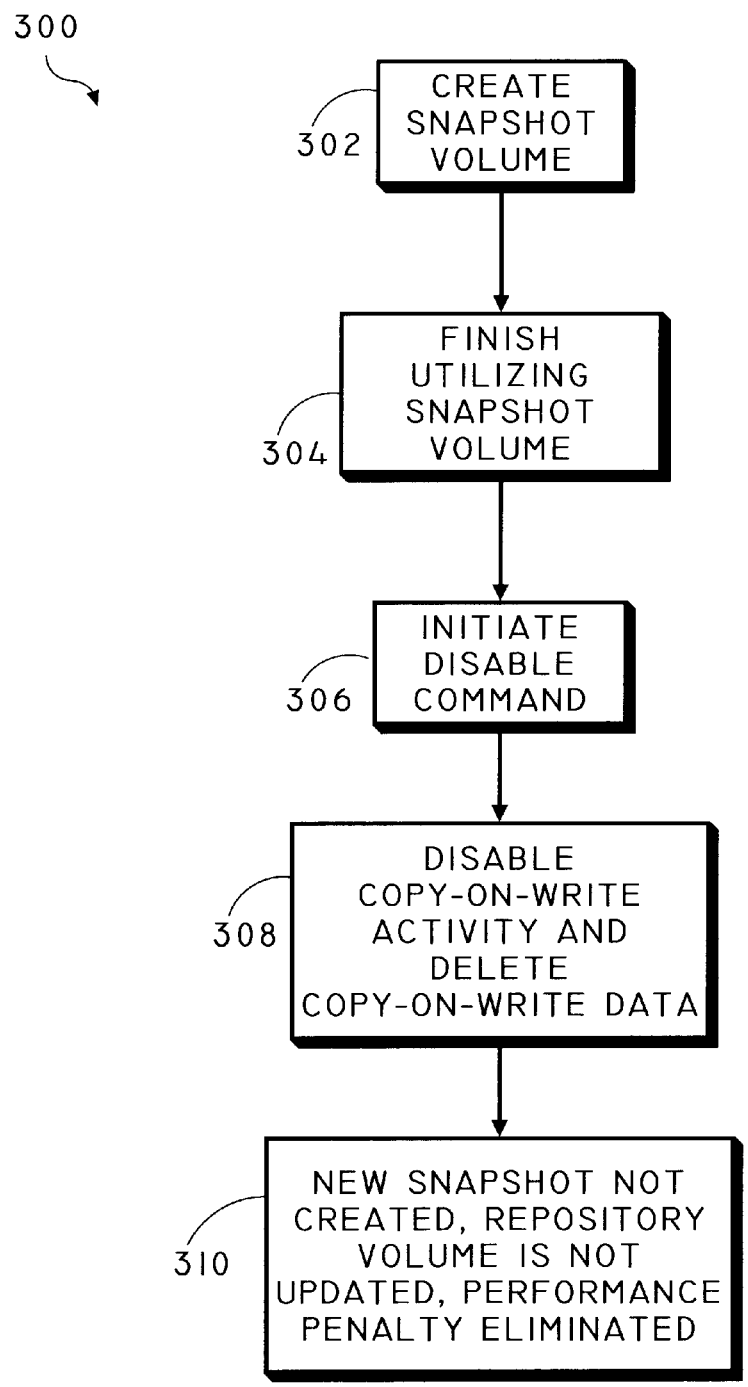
FIG. 3 is a flow diagram depicting an exemplary method of the present invention wherein a disable command is utilized, the disable command preserving repository volume attributes for later use.

Referring now to FIG. 3, an exemplary method 300 of the present invention is shown wherein a disable command is utilized which preserves repository volume attributes for later use. A snapshot volume is created 302 and utilized by a user, such as for testing an application. Once the user has tested the application, and thus has finished utilizing the snapshot volume 304, the user may initiate a disable command 306 to preserve system resources and decrease, and even eliminate, the associated performance penalty.

Upon receiving the disable command, the system halts copy-on-write activity 308 to the repository volume and deletes copy-on-write data. Thus, a new snapshot is not created and the repository volume is not updated 310, yet the repository volume attributes and capacity are available to recreate a new snapshot volume.

Figure 4:
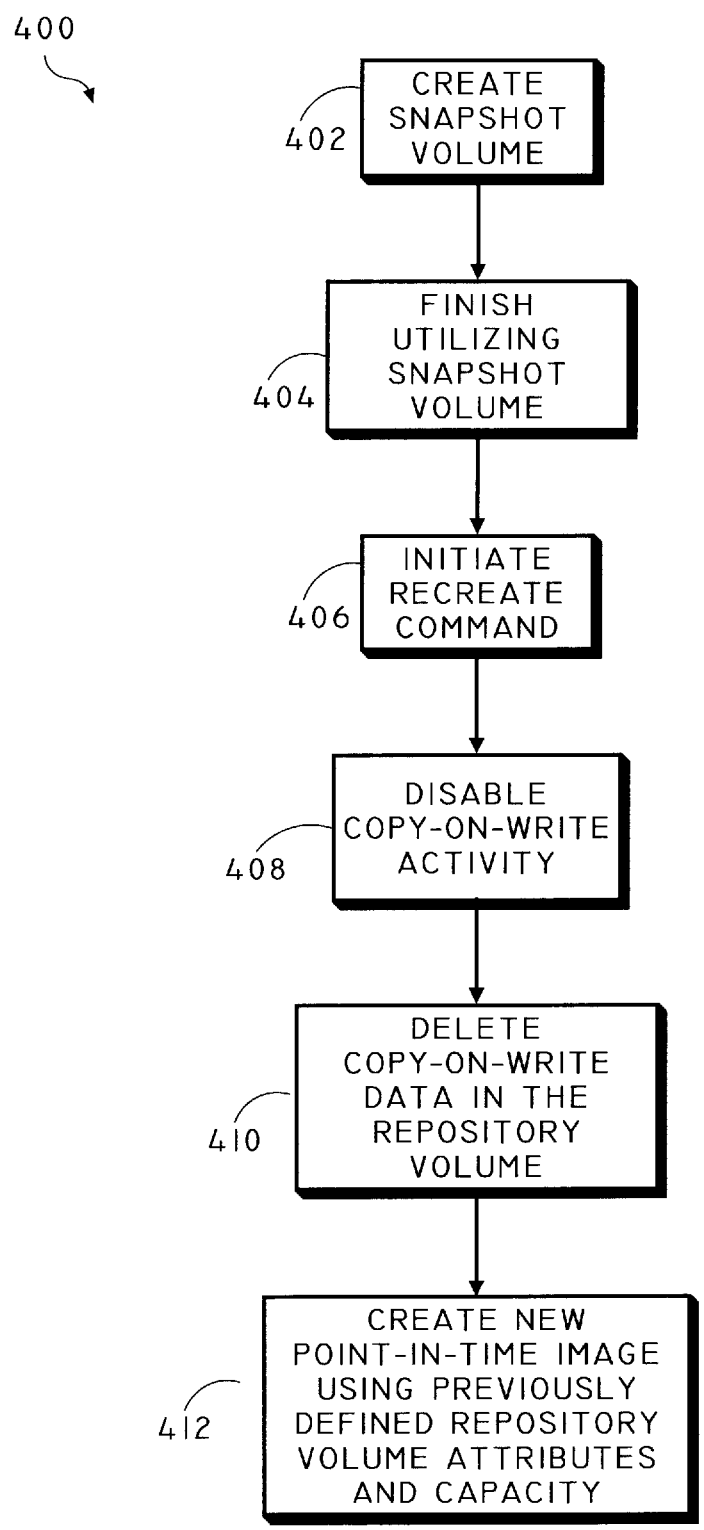
FIG. 4 is a flow diagram of an exemplary method of the present invention wherein a recreate function is utilized to create a new point-in-time image in an efficient manner.
Figure 5:
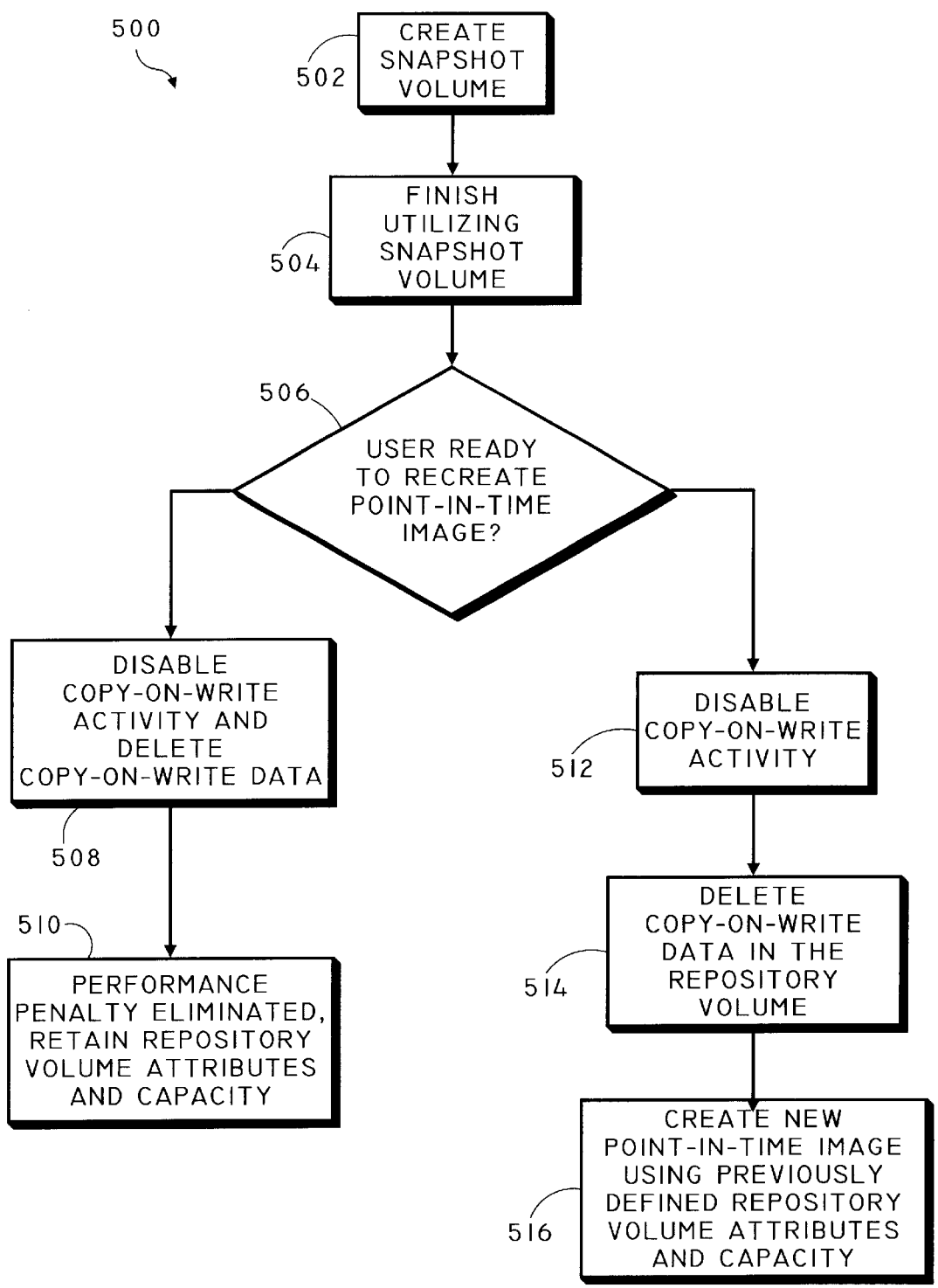
FIG. 5 is a flow diagram illustrating an exemplary method of the present invention wherein disable and recreate command are provided in a electronic data storage system.

Referring now to FIG. 4, an exemplary method 400 of the present invention is shown wherein a recreate function is utilized to create a new point-in-time image in an efficient manner. A snapshot volume is created 402, such as for use as a back up of data stored on a base volume. The snapshot volume is backed up, and thus, the user is finished utilizing the snapshot volume 404. At another point in time, the user may wish to create another snapshot, such as for additional back up purposes, and thus utilize the recreate command of the present invention.

The user initiates a recreate command 406, which disables the copy-on-write activity 408. The copy-on-write data is deleted from the repository volume 410. However, the attributes and capacity of the repository volume are maintained, and thus, do not have to be recreated as previously required. Thus, a new point-in-time image may be created using previously defined repository attributes and capacity 412 in an expedited manner without having to repeat what in many instances may be tedious initial creation steps.

The disable and recreate commands may be included in a data storage and handling system together to give a user even greater functionality. For instance, referring now to FIG. 5, an exemplary method 500 of the present invention is shown wherein disable and recreate commands are provided. A snapshot volume is created 502 and utilization of the volume is completed 504, such as an image stored for back up, image used in application testing, and the like.

A determination is made if a user is ready to recreate a point-in-time image 506. If the user is not ready to create a second point-in-time image, a disable command is initiated, either by a user, automatically by the system, such as after a lapsed defined period of time and like methods as contemplated by a person of ordinary skill in the art. The disable commands halts copy-on-write activity and deletes copy-on-write data 508. Thus, the performance penalty is eliminated, while retaining repository volume attributes and capacity 510, such as for use later in a recreate command.

If the user is ready to recreate a point-in-time image 506, copy-on-write activity is halted, if not previously halted through the use of a disable command and the like. Copy-on-write data included in the repository volume is deleted 514. A new point-in-time image is created using previously defined repository volume attributes and capacity, such as the attributes saved from a previous disable command, attributes retained from an active repository volume, and the like without departing from the spirit and scope of the present invention. In this way, a user is able to create another point-in-time image without having to recreate an associated repository volume.

It is believed that the system and method for disabling and recreating a snapshot volume of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of disabling repository volume activity corresponding to a point-in-time image and retaining repository volume attributes, comprising:

initiating a command in a electronic data storage system, wherein the command disables copy-on-write activity to a repository volume created in relation to a first point-in-time image of a base volume, in which repository volume attributes are retained suitable for providing a repository volume corresponding to a second point-in-time image.

2. The method as described in claim 1, wherein the retained repository volume attributes are preserved so that the second point-in-time image may be created without creating a new repository volume.

3. The method as described in claim 1, wherein the command is initiated to reduce a performance penalty (copy-on-write activity) associated with maintaining the repository volume.

4. The method as described in claim 3, wherein the command eliminates the performance penalty associated with maintaining the repository volume.

5. The method as described in claim 1, further comprising creating a second point-in-time image of the base volume, the second point-in time image utilizing a repository volume having the retained repository volume attributes.

6. The method as described in claim 5, wherein the repository volume created in relation to the first point-in-time image is utilized to create the second point-in-time image.

7. The method as described in claim 6, wherein copy-on-write data included in the repository volume from creating the first point-in-time image is deleted.

8. A method of creating a point-in-time image of a base volume, comprising:
   initiating a command to create a second point-in-time image of a base volume, wherein the second point-in-time image is created utilizing a repository volume having attributes retained from a repository volume created previously with respect to a first point-in-time image.

9. The method as described in claim 8, wherein the first point-in-time image was created from the base volume.

10. The method as described in claim 8, wherein the repository volume created in relation to the first point-in-time image is utilized to create the second point-in-time image.

11. The method as described in claim 10, wherein copy-on-write data included in the repository volume from creating the first point-in-time image is deleted.

12. The method as described in claim 8, further comprising initiating a disable command, wherein the disable command disables copy-on-write activity to a repository volume created in relation to the first point-in-time image of a base volume, in which repository volume attributes are retained.

13. The method as described in claim 8, wherein the retained repository volume attributes are preserved so that the second point-in-time image may be created without creating a new repository volume.

14. The method as described in claim 8, wherein copy-on-write activity to a repository volume is disabled.

15. The method as described in claim 14, wherein copy-on-write activity is disabled to eliminate a performance penalty associated with maintaining the repository volume.

16. An electronic data storage system, comprising:
   an electronic data storage device suitable for storing electronic data; and
   a controller operable to initiate a command to create a second point-in-time image of a base volume, wherein the second point-in-time image is created utilizing a repository volume having attributes retained from a repository volume created with respect to a first point-in-time image.

17. The electronic data storage system as described in claim 16, wherein the first point-in-time image was created from the base volume.

18. The electronic data storage system as described in claim 17, wherein copy-on-write data included in the repository volume from creating the first point-in-time image is deleted.

19. The electronic data storage system as described in claim 16, further comprising initiating a disable command, wherein the disable command disables copy-on-write activity to a repository volume created in relation to the first point-in-time image of a base volume, in which repository volume attributes are retained.

20. The electronic data storage system as described in claim 16, wherein the retained repository volume attributes are preserved so that the second point-in-time image may be created without creating a new repository volume.

* * * * *